(12) United States Patent
Williams et al.

(10) Patent No.: US 10,202,960 B2
(45) Date of Patent: *Feb. 12, 2019

(54) SYSTEMS AND METHODS FOR HYDROELECTRIC SYSTEMS

(71) Applicant: DAYTON HYDRO ELECTRIC LTD., Hamilton, OH (US)

(72) Inventors: Fred E. Williams, Dayton, OH (US); Paul Raymond Kling, Cincinnati, OH (US)

(73) Assignee: Dayton Hydro Electric LTD., Hamilton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,308

(22) Filed: Sep. 27, 2017

(65) Prior Publication Data
US 2018/0030951 A1    Feb. 1, 2018

Related U.S. Application Data

(63) Continuation of application No. 15/495,520, filed on Apr. 24, 2017, now Pat. No. 9,803,614, which is a continuation of application No. 14/602,925, filed on Jan. 22, 2015, now abandoned.

(60) Provisional application No. 61/930,279, filed on Jan. 22, 2014, provisional application No. 62/059,456, filed on Oct. 3, 2014.

(51) Int. Cl.
*H02K 7/18* (2006.01)
*F03B 13/08* (2006.01)

(52) U.S. Cl.
CPC .......... *F03B 13/08* (2013.01); *H02K 7/1807* (2013.01); *F05B 2240/40* (2013.01); *F05B 2260/406* (2013.01); *Y02E 10/22* (2013.01)

(58) Field of Classification Search
USPC .......................... 290/52, 54; 60/398; 405/78
See application file for complete search history.

(56) References Cited

U.S. PATENT DOCUMENTS

| | | | | |
|---|---|---|---|---|
| 3,886,373 A | * | 5/1975 | Okada | F03B 15/06 290/1 R |
| 4,049,972 A | * | 9/1977 | Crowdy | F01D 15/10 290/52 |
| 4,117,676 A | * | 10/1978 | Atencio | F03B 13/086 137/123 |

(Continued)

*Primary Examiner* — Pedro J Cuevas
(74) *Attorney, Agent, or Firm* — Ulmer & Berne LLP

(57) ABSTRACT

Embodiments of a hydroelectric system for a low head dam can include a module including a protective housing, a turbine housing retained within the protective housing, the turbine housing including an upper inlet portion at a first end, a substantially tubular portion, and a lower outlet portion at a second end, the upper inlet portion being positioned above the lower outlet portion, a turbine retained at least partially within the turbine housing, the turbine including a plurality of blades coupled with a central shaft, and a fluid pump, the fluid pump being coupled with the central shaft, where the fluid pump is configured to pump a high pressure fluid, a fluid circuit, the fluid circuit including piping, where the high pressure fluid is retained within the piping, and a generator, the generator being coupled with the fluid circuit, where the generator is driven by the high pressure fluid that is pumped by the fluid pump in response to the rotation of the turbine.

19 Claims, 7 Drawing Sheets

(56) References Cited

U.S. PATENT DOCUMENTS

| | | | | |
|---|---|---|---|---|
| 4,182,123 A * | 1/1980 | Ueda | ............... | F03B 13/086 |
| | | | | 137/123 |
| 4,311,410 A * | 1/1982 | Gutierrez Atencio | ............... | |
| | | | | F03B 13/086 |
| | | | | 290/52 |
| 4,364,228 A * | 12/1982 | Eller | ............... | F03B 13/08 |
| | | | | 137/143 |
| 4,437,017 A * | 3/1984 | Osterberg | ............... | F03B 13/10 |
| | | | | 290/52 |
| 4,629,904 A * | 12/1986 | Rojo, Jr. | ............... | F03B 13/086 |
| | | | | 290/1 R |
| 6,431,821 B1 * | 8/2002 | Feltenberger | ............... | F03B 7/003 |
| | | | | 290/54 |
| 7,084,521 B1 * | 8/2006 | Martin | ............... | F03B 13/086 |
| | | | | 290/50 |
| 7,972,108 B2 * | 7/2011 | Fonkenell | ............... | F03B 3/126 |
| | | | | 415/121.1 |
| 8,182,674 B2 * | 5/2012 | Prigent | ............... | B04C 1/00 |
| | | | | 210/153 |
| 8,196,396 B1 * | 6/2012 | Tseng | ............... | F03B 13/08 |
| | | | | 290/54 |
| 8,823,195 B2 * | 9/2014 | Legacy | ............... | F03B 13/08 |
| | | | | 290/43 |
| 9,593,664 B2 * | 3/2017 | Cripps | ............... | E03F 3/00 |
| 9,803,614 B2 * | 10/2017 | Williams | ............... | F03B 13/08 |
| 10,072,668 B2 * | 9/2018 | Maloyan | ............... | F03B 17/005 |
| 2015/0204301 A1 * | 7/2015 | Williams | ............... | F03B 13/08 |
| | | | | 290/52 |
| 2017/0234288 A1 * | 8/2017 | Williams | ............... | F03B 13/08 |
| | | | | 290/54 |
| 2018/0030951 A1 * | 2/2018 | Williams | ............... | F03B 13/08 |

* cited by examiner

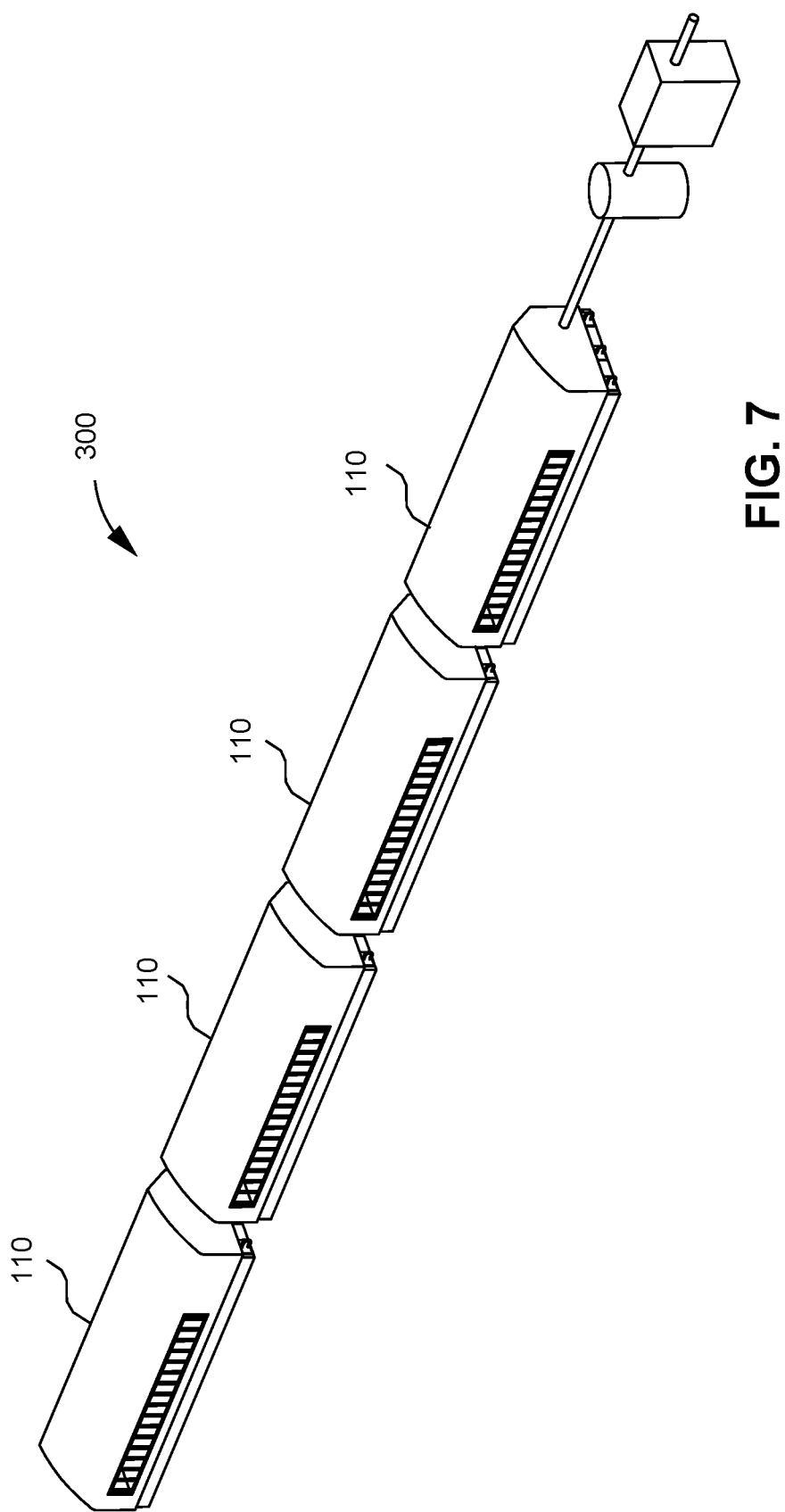

SYSTEMS AND METHODS FOR HYDROELECTRIC SYSTEMS

REFERENCE TO RELATED APPLICATIONS

This application is a continuation of U.S. Non-Provisional application Ser. No. 15/495,520, filed Apr. 24, 2017, which claims priority to U.S. Non-Provisional patent application Ser. No. 14/602,925, filed Jan. 22, 2015, which claims priority to U.S. Provisional Patent Application No. 61/930,279 filed Jan. 22, 2014, and U.S. Provisional Patent Application No. 62/059,456 filed Oct. 3, 2014, which are hereby incorporated herein by reference in their entirety.

TECHNICAL FIELD

Embodiments of the technology relate, in general, to hydroelectric technology, and in particular to hydroelectric systems that can be used to generate power from low dams and other fluid sources.

BRIEF DESCRIPTION OF THE DRAWINGS

The present disclosure will be more readily understood from a detailed description of some example embodiments taken in conjunction with the following figures:

FIG. 7 depicts a perspective view of a system of pump modules of FIG. 5 shown interconnected in series.

BACKGROUND

Figure 1:
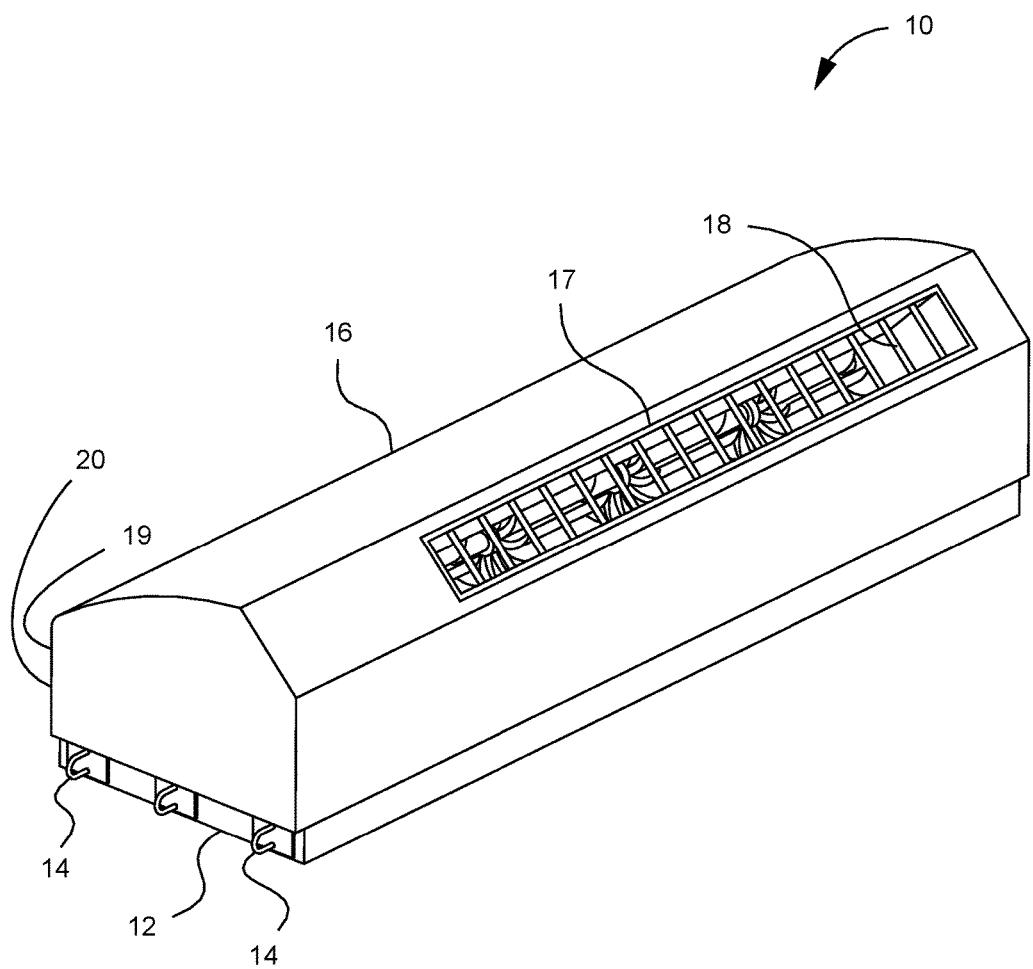
FIG. 1 depicts a perspective view of a hydroelectric generator module according to one embodiment.

Renewable energy resources are gaining global attention due to depleting fossil fuels and harmful environmental effects associated with their usage. Hydro, wind, solar, biomass and geothermal energies form the bulk of renewable energy sources; among which hydro power may offer one of the more sustainable propositions. Traditionally, hydro power has accounted for the bulk of the renewable energy production in the United States. Low dams, also sometimes called low-head dams or weirs, are vertically oriented short dams that can be placed in water channels. Low Dams can be used to maintain a minimum water depth for water supply to a municipality. The reservoir-pool of water created by low dam is often used to supply cooling water for industrial applications. Coal-fired power plants use this pool of water to condense steam back to water for reuse in the boiler. Low Dams have also been constructed to raise the water level to a sufficient height to support recreational boating.

SUMMARY

Embodiments of a hydroelectric system for a low head dam can include a module including a protective housing, a turbine housing retained within the protective housing, the turbine housing including an upper inlet portion at a first end, a substantially tubular portion, and a lower outlet portion at a second end, the upper inlet portion being positioned above the lower outlet portion, a turbine retained at least partially within the turbine housing, the turbine including a plurality of blades coupled with a central shaft, and a fluid pump, the fluid pump being coupled with the central shaft, where the fluid pump is configured to pump a high pressure fluid, a fluid circuit, the fluid circuit including piping, where the high pressure fluid is retained within the piping, and a shoreline generator, the shoreline generator being coupled with the fluid circuit, where the offsite generator is driven by the high pressure fluid that is pumped by the fluid pump in response to the rotation of the turbine.

Embodiments of a method for operating a hydroelectric system can include providing a hydroelectric system, where the hydroelectric system can include a module having a protective housing, a turbine housing retained within the protective housing, the turbine housing including an upper inlet portion at a first end, a substantially tubular portion, and a lower outlet portion at a second end, the upper inlet portion being positioned above the lower outlet portion, a turbine retained at least partially within the turbine housing, the turbine including a plurality of blades coupled with a central shaft, and a fluid pump, the fluid pump being coupled with the central shaft, where the fluid pump is configured to pump a high pressure fluid, a fluid circuit, the fluid circuit including piping, where the high pressure fluid is retained within the piping, and a shoreline generator, the shoreline generator being coupled with the fluid circuit, where the shoreline generator is driven by the high pressure fluid that is pumped by the fluid pump in response to the rotation of the turbine. The method can include positioning the module adjacent a low head dam, where a fluid is flowing over the low head dam, rotating the turbine with the fluid flowing over the low dam, pumping the high pressure fluid with the fluid pump in response to the rotation of the turbine, and driving the shoreline generator with the high pressure fluid to produce electricity.

Embodiments of a hydroelectric system for a low head dam can include a module including a housing means retained within the protective means, a turbine means retained at least partially within the housing means, and a pump means operatively coupled with the turbine means, where the pump means is configured to pump a high pressure fluid, a fluid circuit associated with the pump means, and a generator means coupled with the fluid circuit.

DETAILED DESCRIPTION

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment,"

"some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics may be combined in any suitable manner in one or more embodiments.

Described herein are example embodiments of apparatuses, systems, and methods for hydroelectric power generation. In one example embodiment, a hydroelectric power generator that can be deployed at low dams is disclosed. In some embodiments, the hydroelectric generator can produce power from both the pressure differential created by a low dam as well as the flow velocity of the water channel. In some embodiments, the hydroelectric generator can be self-contained in a submersible module which can further be a hydraulic-hydrokinetic power production module ("HPPM"). In some embodiments, a system of hydroelectric generator systems or HPPMs can be deployed in a water channel to capture a larger amount of energy from the channel than one generator module can capture. In some embodiments, the hydroelectric generator module can generate electricity during the lowest flow-rate condition of a water source. In certain embodiments, the system can include a hydroelectric generator that can efficiently generate power at low dams without ecologically destabilizing a water channel or requiring expensive installation.

The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Example embodiments described herein can beneficially capture energy from water channels during all flow conditions of the channel and can operate without detrimental effect to the water channel's ecology or environment. For example, the flow rate, appearance, and usability of the water channel by boats and wildlife can remain unaffected or substantially unaffected by operation of the generator modules or pump modules described herein. Traditional hydroelectric generators, in contrast, can cause substantial fish kill due to the high speed at which their turbines operate. Additionally, the present hydroelectric generators modules and pump modules can be easily installed with common equipment and without the need of a coffer dam which can be both environmentally damaging and costly to construct. The generators and modules can also be installed in such a way that they do not interfere or compromise the purpose of a low dam. Such a configuration can generate pollution-free electricity. The installation of HPPMs on the downstream side of an existing low dam may have no more of an environmental effect than that of the low dam itself. The hydraulic boils created at the foot of low dams are notorious for entrapping canoers, kayakers, and small boats. Embodiments described herein can cover and absorb the hydraulic boils such that a no-cost low head dam safety retrofit can be provided.

Figure 3:
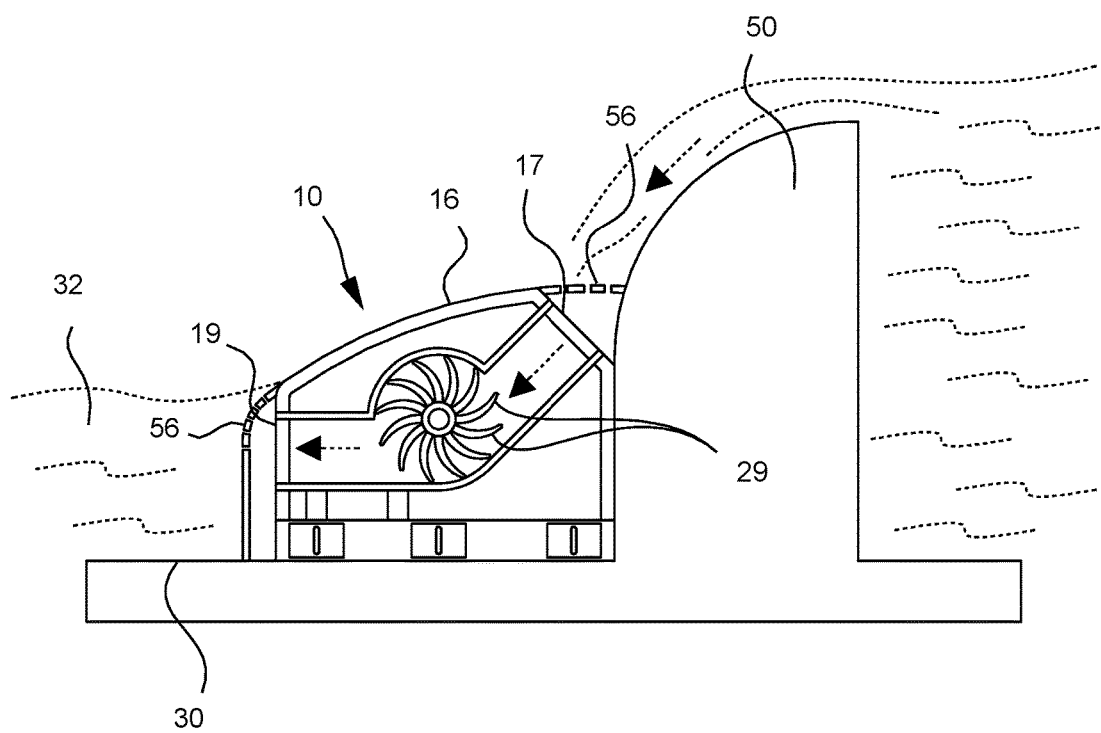
FIG. 3 depicts a left side cross-sectional view of the hydroelectric generator module depicted in FIG. 1 shown adjacent a low head dam according to one embodiment.

Referring now to FIG. 1, a hydroelectric generator module 10 is depicted according to one embodiment. The generator module 10 can be water submersible and can be attached to, or adjacent to, a low dam 50 (FIG. 3). The generator module 10 can be located on a platform 12, such as a concrete platform, for support. The platform 12 can also assist in installation of the generator module 10. For example, the platform 12 can include mounting points 14 that can assist in installation or removal of the generator module 10 by common moving equipment. In some examples, the platform 12 can additionally, or in the alternative, include shaped cavities (not shown) along a bottom surface to allow the generator module to be transported by a forklift or other suitable vehicle. The mounting points 14 can include hooks, rings, or any other suitable coupling or connection. The generator modules can be designed for easy placement and removal or, alternatively, the generator modules can be permanently affixed or integrally coupled with a low head dam. Any suitable anchoring method is contemplated such as bolted, weighted, wedged, cemented, hinged, or welded anchoring mechanisms, for example.

Figure 2:
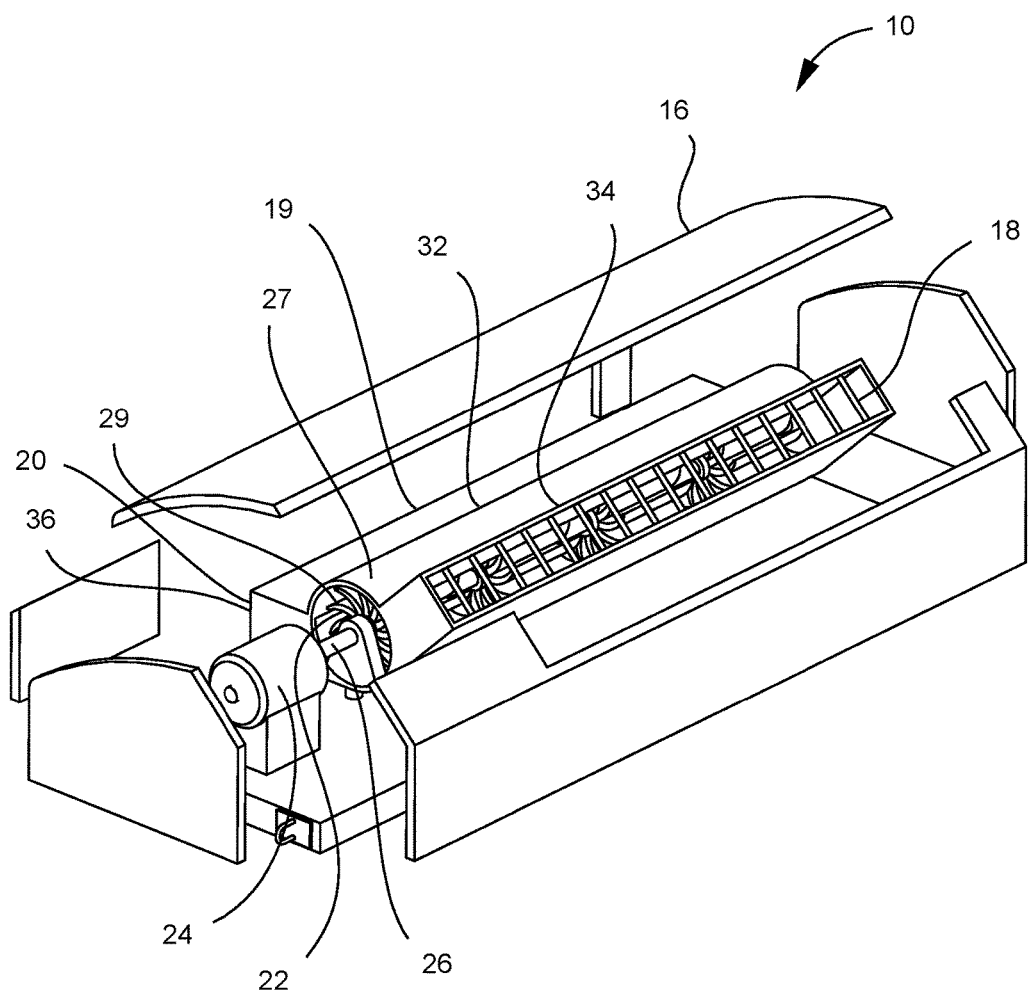
FIG. 2 depicts a perspective partially exploded view of the hydroelectric generator module depicted in FIG. 1.

The generator module 10 can have a protective enclosure 16 that can protect internal components as well as wildlife and recreational users of waterways. The protective cover 16 can be configured to make the generator module 10 look like a part of the low dam 50 to provide an aesthetically pleasing appearance. In one example, the protective enclosure 16 can be concrete. In another example, the protective enclosure 16 can be metal. In another example, the protective enclosure 16 can be a ceramic material. The protective enclosure 16 can include a first opening 17 protected by an upstream grate 18 and a second opening 19 protected by a downstream grate 20 that can prevent debris from damaging the turbine and generator located inside. The first opening 17 can allow head water from the water channel to flow through the generator module 10 to produce electricity. Head water can exit the generator module 10 through the second opening 19 after flowing through the internal turbine 22 (FIG. 2). The first opening 17 can be positioned above the second opening 19 to match the direction flow of fluid over the low head dam as illustrated in FIG. 3. The first opening 17 and second opening 19 can have the same dimensions or can be configured differently. The first opening 17 and second opening 19 can have a width of from about 1 inch to about 2 inches in one embodiment. The first opening 17 can have a funnel shape or any other suitable shape for directing water into the module 10.

Any suitable protective housing 16 is contemplated. The protective housing 16 can substantially surround the turbine housing 27 (FIG. 2) and can provide debris protection, increase operational safety, enhance aesthetics, improve flow characteristics, and efficiency of the generator module 10. The protective housing 16 can be mass produced, or can be designed to substantially match the flow characteristics of a particular waterway. The protective housing 16 can improve protection of various aquatic biology and can prevent damage of the turbine that can be caused by such aquatic biology. The protective housing 16 can be metallic, aluminum plate, light weight, and low corrosion. The protective housing 16 can be steel plate that is cost effective and machinable. The protective housing 16 can be formed from metallic castings that are cost effective and reproducible at high production volumes. The protective housing can include non-metallic, biologically inert materials that may improve environmental compatibility. Such materials can include recycled plastic, which may have the advantage of being low cost and environmentally friendly. Materials can include HDPE, XLPE, or other readily available, low cost materials with well-known properties. The protective housing 16 can include composite materials such as carbon fiber, which may have enhanced operational and component forming properties. Housing coatings (not shown) may provide additional debris protection, increase operational safety, enhance aesthetics, improve flow characteristics and efficiency, slow deterioration, and/or improve the protection of aquatic biology. The protective housing 16 coatings can include cementacious materials, which are generally inexpensive and can provide additional durability, carbon nanotube materials, which can prevent adherence of biologic material, and epoxies, resins, or enamels, which can add additional strength and corrosion resistance.

FIG. 2 depicts a partially exploded view of a generator module 10 according to one embodiment with the protective enclosure 16 removed. The generator module 10 can include a turbine 22 and a generator 24. The turbine 22 can be operationally similar to a water wheel and can include any number of blades 29 that can project radially outward from a central shaft 26. In one example, the turbine 22 can include six blades. In another example, a turbine 22 can include nine blades. In another example, a turbine 22 can include twelve, or more blades. The generator 24 can be a variable capacity generator that can operate over a range of water flow velocities. The generator 24 can be directly coupled to the central shaft 26 of the turbine 22 or the generator 24 can alternatively be connected to an intermediary gearbox (not shown). The turbine 22 and generator 24 can operate at relatively slow speeds to prevent damage to the ecosystem. For example, the turbine can operate at from about 20 to about 100 RPM, from about 30 to about 60 RPM, at less than about 50 RPM, at 60 RPM, or at less than about 120 RPM. The relatively low speed can also prevent the generator module 10 from causing fish kill. The overall efficiency of the generator module can be at least about 70%, at least about 75%, at least about 80%, at least about 85%, or at least about 90%. The turbine and generator can be coupled directly to the platform 12 for stability, or can be coupled with the protective enclosure 16 that can be selectively removable from a fixed platform 12.

The generator module 10 can have any suitable structure for a central shaft 26. The central shaft 26 can be designed in sections from about 4 feet to about 10 feet in length, for example, along the shaft axis allowing each section to be constructed with the turbine blades 29 as a module and aligned and fitted in a turbine housing 27 with a total length ranging from about 6 feet to about 60 feet, for example. The central shaft 26 can be constructed of solid, tubular, or semi-solid metallic, non-metallic, or composite material. The central shaft 26 can be formed, cast, machined, extruded, or configured using any combination of these manufacturing methods. Adjacent axial shafts can be connected by any number of methods including, but not limited to, bolted flanges, flexible or mechanical couplings, welded joints, sleeve and key, or any combination of these mechanisms. Turbine shaft bearings (not shown) can be configured in any suitable manner from any suitable material such as utilizing specialized wood (Lignum Vitae) bearings, sealed steel roller or ball bearings, full contact malleable metallic materials, or full contact malleable non-metallic materials. A small space or cutout (not shown) between the blades and shaft of the turbine can be provided to minimize the presence and effect of air bubbles.

The turbine 22 can be housed within the turbine housing 27, which can include a substantially tubular portion 32, an upper inlet portion 34, and a lower outlet portion 36. The substantially tubular portion 32 can be sized to accommodate any suitable turbine 22. It will be appreciated that the tubular portion 32 is described by way of example only, where any suitable shape is contemplated. The upper inlet portion 34 can include the upstream grate 18 and the lower inlet portion 36 can include the downstream grate 20. The upper inlet portion 34 can have any suitable size, shape, or configuration to direct the flow of fluid through the turbine housing 27 past the turbine 22. The upper inlet portion 34 can be substantially the length of the generator module 10, can be shorter than the length of the generator module 10, or can be wider or longer than the generator module 10 with a funnel (not shown) or other mechanism for drawing fluid into the turbine housing 27. The turbine housing 27 can include a plurality of upper inlet portions and a plurality of lower outlet portions having any suitable shape or configuration. In one embodiment, generator module 10 can have a flexible or pivotable protective enclosure 16 and/or turbine housing 27 such that the turbine housing 27 and/or protective enclosure 16 can be adjusted relative to the flow of water over the dam 50. For example, the turbine housing 27 can be a pivoting housing relative to the platform 12 to enable the upper inlet portion 34 to the turbine 22 to be at an optimal angle relative to the adjacent dam 50 and the flow of water. The adjustable or pivotable structure can be mechanically adjusted or, in one embodiment, can be associated with a controller that can automatically adjust the position of the structure based upon water flow, environmental conditions, or the like.

FIG. 3 depicts a side cross-sectional view of a generator module 10 and low dam 50 according to one embodiment. The generator module 10 can be installed on the low dam 50 such that it can collect substantially all of the water flowing over the low dam 50. Installation in this manner can allow the generator module 10 to appear as if it is part of the low dam 50. In some examples, a protective mesh 26 can be attached to the generator module at about the first opening 17 and/or at about the second opening 19. The protective mesh can extend from the generator module 10 and connect an area above the first opening 17 to the low dam 50. The protective mesh 26 can extend from above the second opening 19 to the floor 30 of the water channel 32. The protective mesh 26 materials can prevent small debris from flowing into the generator module and causing damage. In other examples, a single mesh can extend from the low dam 50 to the water channel floor 30 as a substantially contiguous cover to achieve substantially the same effect. The protective mesh 26 can be fabricated from biologically inert material, wear resistant material, can be design to withstand floodstage debris impingement, and/or can be used in conjunction with a back-flow screen or great cleaning system.

Figure 4:
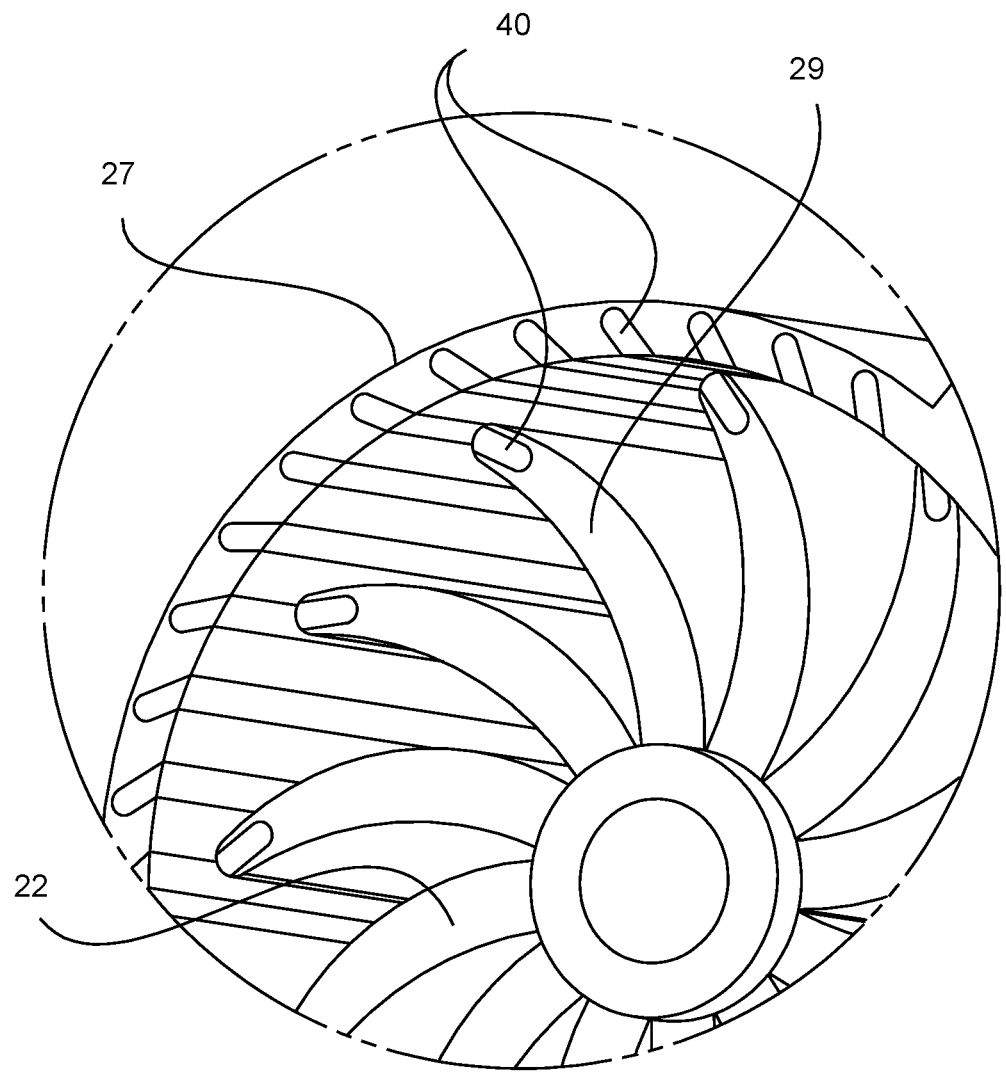
FIG. 4 depicts a partial perspective view of the hydroelectric generator module depicted in FIG. 1 shown with embedded magnets.

FIG. 4 depicts the installation of permanent magnets 40 according to one embodiment. Permanent magnets 40 can be installed on the turbine housing 27 and turbine blades 29, where the permanent magnets 40 can assist in the startup of the turbine 22 by causing the turbine blades 29 to experience a slight magnetic repulsion boost each time the turbine blades 29 rotates past a permanent magnet 40 in the turbine housing 27. This can be useful in maintaining rotation at low speeds, for example.

Turbine blades 29 can be fabricated from any number of different materials using any number of machining or forming processes. In each case, a mathematical formula based on anticipated flow rate at the specific installation site can be used to determine the optimal blade shape and size as well as the number of blades comprising the turbine 22 for maximum efficiency versus production costs, installation costs, and full life-cycle costs. Blade curvature and number of blades can be mathematically optimized using the blade element momentum (BEM) theory, for example, over the anticipated flow range for maximum power transfer efficiency and acceptable life cycle economic costs. The BEM theory is described in more detail in *Hydrodynamic Design and Optimization of Hydro-Kinetic Turbines using a Robust Design Method*, by Nitin Kolekar, et al., Proceedings of the 1st Marine Energy Technology Symposium, Apr. 10-11, 2013, Washington, D.C., which is herein incorporated by reference in its entirety. Factors such as number of blades, tip speed ratio, type of airfoil, blade pitch, and chord length and twist can be considered. Flow range can be considered for maximum power transfer efficiency and acceptable life cycle economic costs. Blades 29 can include metallic blades, such as aluminum blades, which can be plates, formed blades, cast blades, machined blades, bent blades, extruded blades, or the like, where such aluminum blades may be readily machineable and cost effective. Steel blades can be used that have high strength, low cost, and manufacturing familiarity. Brass or bronze blades can be used that can exhibit corrosion resistance. Non-metallic blades, such as carbon fiber composite and ceramic blades, can exhibit wear resistance and low life cycle costs. Plastics may have a low cost, high availability, and may be biologically inert, and can include HDPE, XLPE, recycled plastic, and laminates, singularly or in combination. It will be appreciated that any suitable combination of materials including wood, resins, plastics, metallic, and/or ceramic is contemplated.

Figure 5:
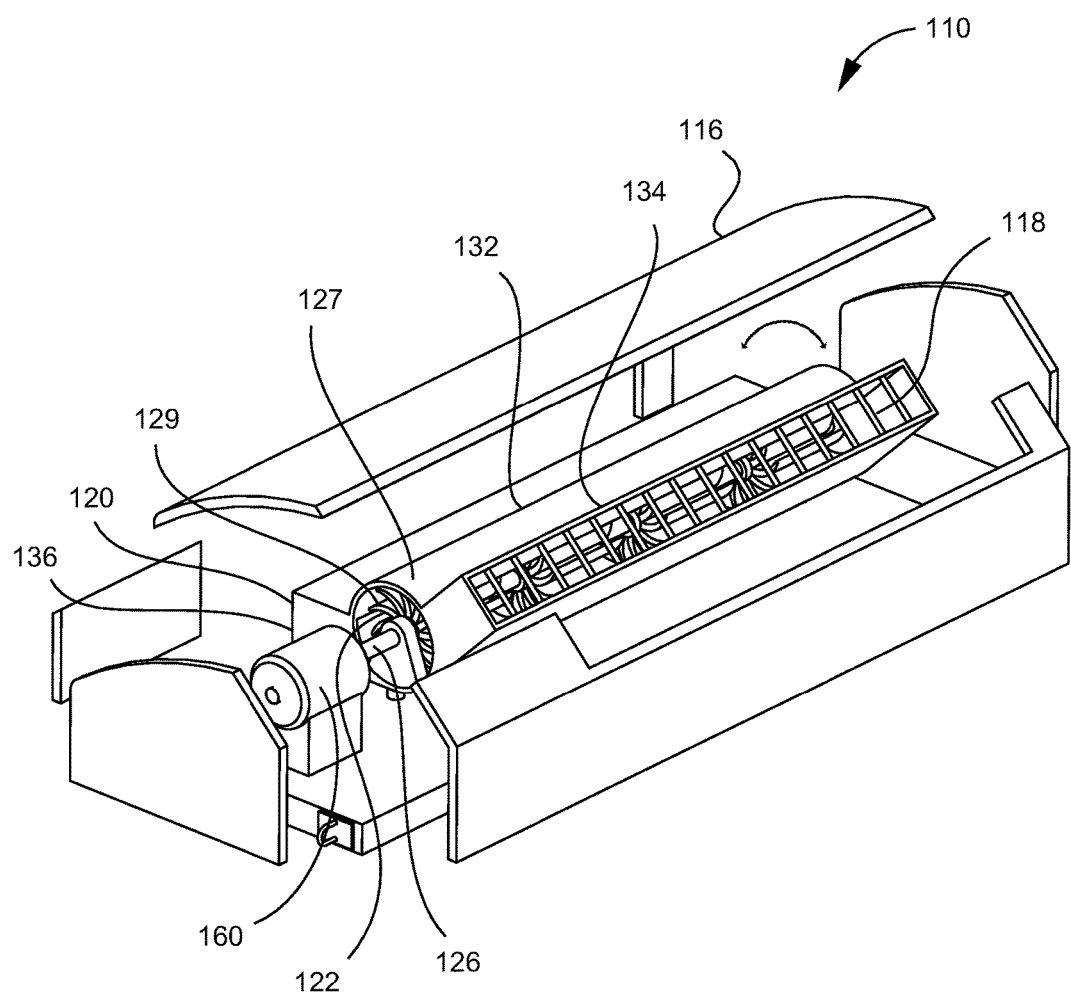
FIG. 5 depicts a perspective view of a pump module according to one embodiment.

Referring to FIG. 5, an alternate embodiment of a module 110 is shown. The module 110 can include a protective enclosure 116, a turbine 122, and a fluid pump 160. The turbine 122 can include any number of blades 129 that can project radially outward from a central shaft 126. The fluid pump 160 can be used to pump high pressure fluids, such as biodegradable, biologically inert, or non-compressible fluids, or combinations thereof, from the module 110 to a generator 124 (FIG. 6) positioned on the shoreline or at a distance from the module 110. The turbine 122 can be housed within a turbine housing 127 that can have a substantially tubular portion 132, an upper inlet portion 134, and a lower outlet portion 136. The substantially tubular portion 132 can be sized to accommodate any suitable turbine 122. The upper inlet portion 134 can include an upstream grate 118 and the lower inlet portion 136 can include the downstream grate 120. The module 110 configuration can include the central shaft 126 being connected to the fluid pump 160. Systems can be configured for screen or grate cleaning systems and can be back flushed with water and/or back flushed with air. It will be appreciated that the module 110 can also be attached to a water submersible electric generator.

Figure 6:
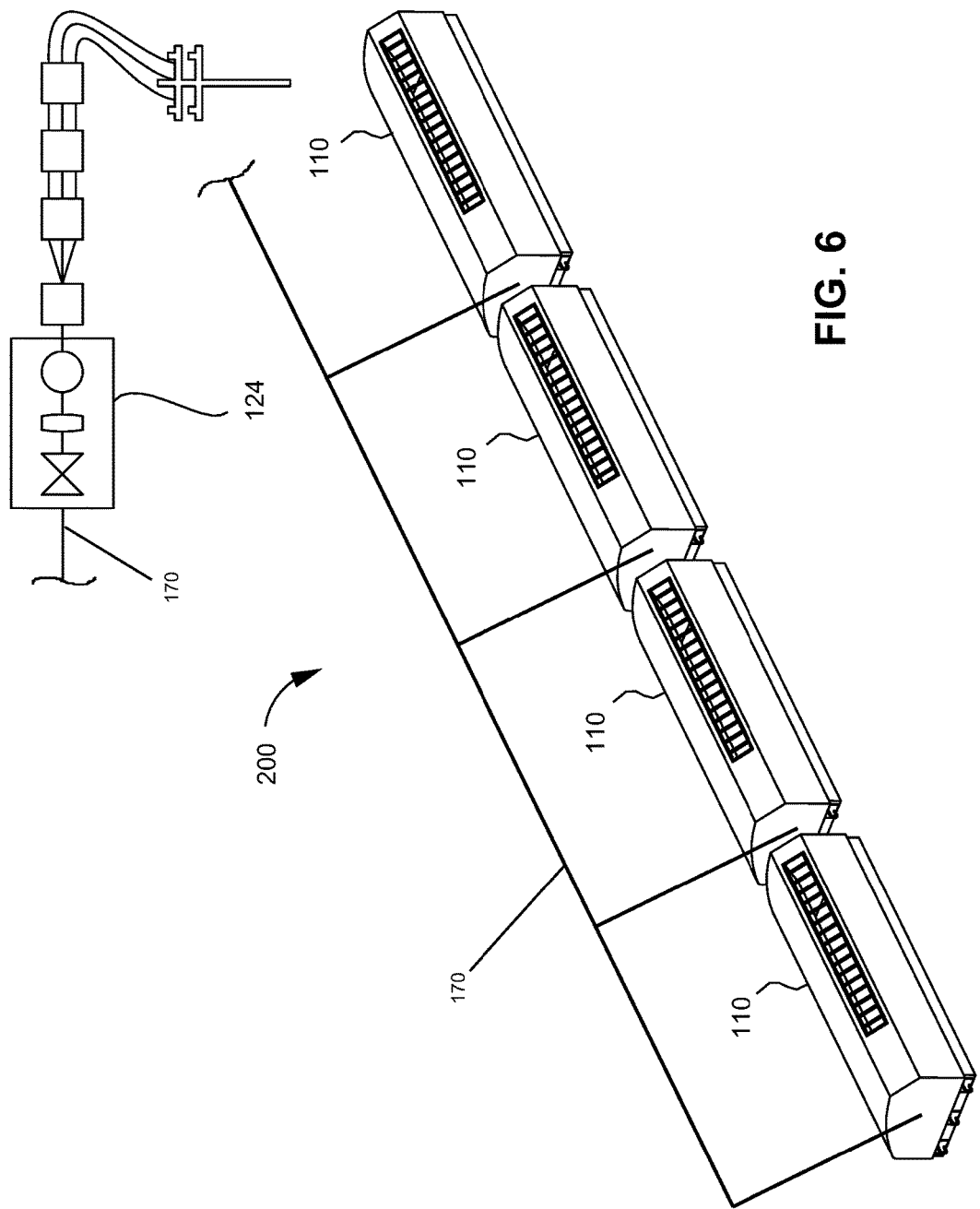
FIG. 6 depicts a perspective view of a system of interconnected pump modules shown associated with a land-based generator.

Referring to FIG. 6, a plurality of modules 110 can be coupled into a pressurized fluid system 200. In the illustrated system 200, the fluid pumps 160 from each of the modules 110 can form a plurality of circuits 170, where each fluid pump 160 can be connected to a header body. Fluid from the system 200 can be used to generate electricity from an offsite or shore-based generator 124 or turbine. The system 200 can include a single turbine powered pump system, a multiple pump system with combined header system, and can utilize any suitable flexible or rigid tubing or piping in any suitable configuration. In an example embodiment, the system 200 can include one or a plurality of pressure and/or flow regulators that can maintain a substantially constant rate of flow and/or pressure to a shore-based generator or turbine. The pressure and/or flow regulator can include ball valves, or the like, having any suitable dimensions and can include a variety of different sized ball valves. The one or a plurality of fluid pumps associated with the system 200 can pump fluid to a remote generator incorporating an internal inverter, a generator having a separate inverter, or is a pressure and/or fluid regular is used no inverter may be required. The circuits 170 can include any suitable fittings, tubing, connectors, or the like. In one embodiment, the system can incorporate a pre-configured IEEE 1547 standard (Institute of Electrical and Electronics Engineers, Standard 1547) compliment of components for grid connection. An electrical interconnection configuration can include frequency feedback from a grid, can be designed without frequency from a grid, or can be configured or optimized for micro-grid applications.

FIG. 7 illustrates a system 300 having a plurality of modules 110 in series according to one embodiment. It will be appreciated that any suitable number, size, placement, and spacing of modules 110 is contemplated.

Systems described herein can generate a certain minimum amount of power even in low flow rate conditions. In addition to installation on a low dam 50, a generator module or pump module can alternatively be installed in a water channel. In one embodiment, a generator module 10 or module 110, in this example, can still generate electricity from the flow rate of the water channel as a result of the low-speed efficiency of the turbine. The generator module 10 or module 110 can operate, for example, in any water channel that has a continuous or substantially continuous flow rate such as, for example, a river, stream, creek, or waste water treatment facility exit trough. Such a system can be useful to establish a minimum level of power production. This can be advantageous for the present system because renewable power sources are traditionally subject to a wide variability in minimum generation which can necessitate that utility companies maintain a large reserve of generating capacity. For example, a utility company that operates a wind farm may have to maintain a coal plant in ready status in case the wind farm becomes inoperable due to falling wind speeds. Power generated through the systems depicted herein may negate this issue by providing a base amount of power.

In one embodiment, a generator module or pump module, such as generator module 10 or module 110, can continue to generate electricity up to and during the infrequent period when tail water converges to the same level as head water, or zero head. Flow volume can continue to descend the crest of the dam during this period and this kinetic energy can be sufficient to generate appreciable amounts of electricity. Conventional pressure-driven hydroelectric designs may not generate any electricity during this period, which may minimize their overall efficiency and effectiveness.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

We claim:

1. A hydroelectric system for a low head dam comprising:
   (a) a module including;
      (i) a protective housing having a height and a width, wherein the width of the protective housing is greater than the height of the protective housing;
      (ii) a turbine housing retained within the protective housing, the turbine housing having a height and a width, wherein the width of the turbine housing is greater than the height of the turbine housing;
      (iii) a turbine retained at least partially within the turbine housing, the turbine including a plurality of blades coupled with a substantially horizontal central shaft, wherein the substantially horizontal central shaft of the turbine has an axis of rotation that is substantially perpendicular to the fluid flow direction during operation; and
      (iv) a fluid pump, the fluid pump being coupled with the substantially horizontal central shaft, wherein the fluid pump is configured to pump a high pressure fluid;
   (b) a fluid circuit, the fluid circuit including piping, wherein the high pressure fluid is retained within the piping; and
   (c) a generator, the generator being spaced apart a distance from the module and operably coupled with the fluid circuit, wherein the generator is driven by the high pressure fluid that is pumped by the fluid pump in response to the rotation of the turbine.

2. The hydroelectric system of claim 1, wherein the high pressure fluid is selected from the group consisting of biodegradable fluid, biologically inert fluid, and non-compressible fluid.

3. The hydroelectric system of claim 1, wherein the module further includes a protective mesh.

4. The hydroelectric system of claim 1, further comprising an upstream grate and a downstream grate associated with the turbine housing.

5. The hydroelectric system of claim 1, wherein the turbine housing is pivotable relative to the protective housing.

6. The hydroelectric system of claim 1, wherein the turbine comprises from six to twelve blades.

7. The hydroelectric system of claim 1, wherein the turbine is configured to rotate at less than fifty rotations per minute.

8. The hydroelectric system of claim 1, further comprising a regulator that maintains the high pressure fluid at a constant flow and pressure such that the generator is operated at a substantially constant rate.

9. The hydroelectric system of claim 1, wherein the piping of the circuit includes at least a portion directed upstream of a low dam to disrupt calm water.

10. The hydroelectric system of claim 1, further comprising a plurality of modules associated with the fluid circuit.

11. The hydroelectric system of claim 10, wherein the plurality of modules are arranged in series such that the plurality of modules in series is substantially perpendicular to a flow of water.

12. A method for operating a hydroelectric system comprising:
    providing a hydroelectric system including;
       (a) a module including;
          (i) a protective housing having a height and a width, wherein the width of the protective housing is greater than the height of the protective housing;
          (ii) a turbine housing retained within the protective housing, the turbine housing having a height and a width, wherein the width of the turbine housing is greater than the height of the turbine housing;
          (iii) a turbine retained at least partially within the turbine housing, the turbine including a plurality of blades coupled with a substantially horizontal central shaft, wherein the substantially horizontal central shaft of the turbine has an axis of rotation that is substantially perpendicular to the fluid flow direction during operation; and
          (iv) a fluid pump, the fluid pump being coupled with the substantially horizontal central shaft, wherein the fluid pump is configured to pump a high pressure fluid;
       (b) a fluid circuit, the fluid circuit including piping, wherein the high pressure fluid is retained within the piping; and
       (c) a generator, the generator being spaced apart a distance from the module and operably coupled with the fluid circuit, wherein the generator is driven by the high pressure fluid that is pumped by the fluid pump in response to the rotation of the turbine;
    positioning the module adjacent a low head dam such that the module is substantially parallel to the low head dam, wherein a fluid is flowing over the low head dam;
    rotating the turbine with the fluid flowing over the low dam, wherein the turbine is substantially perpendicular to the flow of the fluid;
    pumping the high pressure fluid with the fluid pump in response to the rotation of the turbine; and
    driving the generator with the high pressure fluid to produce electricity.

13. The method of claim 12, further comprising the step of pivoting the turbine housing relative to the protective housing such that flow of the fluid through the module is optimized.

14. The method of claim 12, further comprising a plurality of modules associated with the fluid circuit.

15. The method of claim 12, wherein the step of rotating the turbine comprises rotating the turbine at less than fifty revolutions per minute.

16. The method of claim 12, wherein the fluid circuit includes a regulator that maintains the high pressure fluid at a constant flow and pressure such that the generator is operated at a substantially constant rate.

17. A hydroelectric system for a low head dam comprising:
    (a) a module including;
       (i) a protective housing having a height and a width, wherein the width of the protective housing is greater than the height of the protective housing;
       (ii) a turbine housing retained within the protective housing, the turbine housing having a height and a width, wherein the width of the turbine housing is greater than the height of the turbine housing;
       (iii) a turbine retained at least partially within the turbine housing, the turbine including a plurality of blades coupled with a substantially horizontal central shaft, wherein the substantially horizontal central shaft of the turbine rotates in a direction substantially perpendicular to the flow of fluid during operation;

(iv) a fluid pump, the fluid pump being coupled with the substantially horizontal central shaft, wherein the fluid pump is configured to pump a high pressure fluid;

(v) a mounting platform, wherein the protective housing is detachably coupled with the mounting platform; and (vi) at least one mounting point coupled with the mounting platform, wherein the at least one mounting point selectively couples the module adjacent a low head dam such that the module can be easily attached and removed;

(b) a fluid circuit, the fluid circuit including piping, wherein the high pressure fluid is retained within the piping; and (c) a generator, the generator being spaced apart a distance from the module and being operably coupled with the fluid circuit, wherein the generator is driven by the high pressure fluid that is pumped by the fluid pump in response to the rotation of the turbine.

18. The hydroelectric system of claim 17, wherein the protective housing has a substantially horizontal aperture such that fluid can enter the protective housing and the turbine housing retained therein.

19. The hydroelectric system of claim 17, wherein the turbine housing is pivotable relative to the protective housing.

* * * * *